(12) United States Patent  
Nakatsu et al.

(10) Patent No.: US 11,561,167 B2  
(45) Date of Patent: Jan. 24, 2023

(54) LIQUID SENSOR

(71) Applicant: NIPPON PILLAR PACKING CO., LTD., Osaka (JP)

(72) Inventors: Akira Nakatsu, Osaka (JP); Kentaro Watanabe, Osaka (JP)

(73) Assignee: NIPPON PILLAR PACKING CO., LTD., Osaka (JP)

( * ) Notice: Subject to any disclaimer, the term of this patent is extended or adjusted under 35 U.S.C. 154(b) by 0 days.

(21) Appl. No.: 17/514,092

(22) Filed: Oct. 29, 2021

(65) Prior Publication Data  
US 2022/0155219 A1 May 19, 2022

(30) Foreign Application Priority Data  
Nov. 13, 2020 (JP) .............................. JP2020-189373

(51) Int. Cl.  
*G01N 21/31* (2006.01)  
*G01N 21/85* (2006.01)

(52) U.S. Cl.  
CPC .......... *G01N 21/31* (2013.01); *G01N 21/8507* (2013.01); *G01N 2021/8528* (2013.01)

(58) Field of Classification Search  
CPC ............... G01N 21/8507; G01N 21/31; G01N 2021/8528  
See application file for complete search history.

(56) References Cited

U.S. PATENT DOCUMENTS

| 3,692,410 | A | * | 9/1972 | Jurany | .................... | G01N 33/49 356/40 |
| 5,371,600 | A | * | 12/1994 | Hsia | .................... | G01N 21/8507 356/440 |
| 6,693,285 | B1 | * | 2/2004 | Weiss | .................... | G01F 23/292 250/577 |

(Continued)

FOREIGN PATENT DOCUMENTS

| JP | 5-273121 A | 10/1993 |
| JP | 2005274221 A | * 10/2005 |

*Primary Examiner* — Jamil Ahmed  
(74) *Attorney, Agent, or Firm* — Birch, Stewart, Kolasch & Birch, LLP

(57) ABSTRACT

Provided is a liquid sensor that can more accurately detect the state of a liquid. The liquid sensor includes a light emitting element, an optical waveguide, a light receiving element, and a detection circuit. The light receiving element is configured to receive light that was emitted by the light emitting element and passed through the optical waveguide. The detection circuit is configured to detect output of the light receiving element. The optical waveguide includes a first pillar portion that extends straight and a second pillar portion that extends straight. The second pillar portion is provided at a position opposing the first pillar portion. A space for liquid is formed between the first pillar portion and the second pillar portion. The first pillar portion includes a first end surface that faces the light emitting element, and a second end surface that is tilted relative to the first end surface and reflects light toward the second pillar portion. The second pillar portion includes a third end surface that (Continued)

faces the light receiving element, and a fourth end surface that is tilted relative to the third end surface and is configured to reflect light from the second end surface toward the light receiving element.

5 Claims, 7 Drawing Sheets

(56) References Cited

U.S. PATENT DOCUMENTS

| | | | |
|---|---|---|---|
| 7,936,459 B1* | 5/2011 | Coombs | G01N 21/8507 356/436 |
| 2002/0069021 A1* | 6/2002 | Takezawa | G01N 21/3151 702/28 |
| 2009/0015822 A1* | 1/2009 | Uchida | G01N 21/359 356/135 |
| 2010/0027015 A1* | 2/2010 | Schweng | G01N 21/8507 356/432 |
| 2010/0214556 A1* | 8/2010 | Mannhardt | G01N 21/8507 356/73 |
| 2012/0026495 A1* | 2/2012 | Park | G01N 21/31 356/326 |
| 2014/0183380 A1* | 7/2014 | Ukon | G01N 33/0009 250/573 |
| 2016/0252448 A1* | 9/2016 | Ida | G01N 21/8507 356/70 |
| 2016/0252490 A1* | 9/2016 | Shi | G01N 33/2888 356/70 |
| 2016/0266039 A1* | 9/2016 | Suzuki | G01N 21/8507 |
| 2017/0290518 A1* | 10/2017 | Akerman | G01N 21/314 |
| 2019/0257749 A1* | 8/2019 | Hazama | G01N 21/8507 |
| 2019/0316965 A1* | 10/2019 | Kobayashi | G01N 21/8507 |
| 2021/0310942 A1* | 10/2021 | Jones | G01N 21/314 |
| 2022/0155128 A1* | 5/2022 | Nakatsu | G01N 21/59 |

* cited by examiner

LIQUID SENSOR

CROSS REFERENCE TO RELATED APPLICATIONS

This application claims priority to Japanese Patent Application No. 2020-189373 filed on Nov. 13, 2020, the entire contents of which are incorporated herein by reference.

TECHNICAL FIELD

The present invention relates to a liquid sensor, and particularly to a liquid sensor configured to detect the state of a liquid.

BACKGROUND ART

JP H5-273121A (Patent Document 1) discloses a liquid sensor. In this liquid sensor, light emitted by a light emitting element passes through a liquid, and the light that passes through the liquid is detected by a light receiving element. In this liquid sensor, contamination of the liquid is determined based on the detection result (see Patent Document
JP H5-273121A is an example of related art.

SUMMARY OF THE INVENTION

An object of the present invention is to provide a liquid sensor that can more accurately detect the state of a liquid.

A liquid sensor according to the present invention is configured to detect a state of a liquid. The liquid sensor includes a light emitting element, an optical waveguide, a light receiving element, and a detection circuit. The light receiving element is configured to receive light that was emitted by the light emitting element and passed through the optical waveguide. The detection circuit is configured to detect output of the light receiving element. The optical waveguide includes a first pillar portion that extends straight, and a second pillar portion that extends straight. The second pillar portion is provided at a position opposing the first pillar portion. A space for the liquid is formed between the first pillar portion and the second pillar portion. The first pillar portion includes a first end surface that faces the light emitting element, and a second end surface that is tilted relative to the first end surface and is configured to reflect the light toward the second pillar portion. The second pillar portion includes a third end surface that faces the light receiving element, and a fourth end surface that is tilted relative to the third end surface and is configured to reflect the light from the second end surface toward the light receiving element.

In this liquid sensor, the optical waveguide includes the first pillar portion and second pillar portion. The first pillar portion and the second pillar portion are each straight and do not have a bent structure, and thus the leakage of light passing through the first pillar portion and the second pillar portion can be suppressed more than in the case where the light transmitting portions have a bent structure. Therefore, according to this liquid sensor, the leakage of light to the outside of the optical waveguide is relatively suppressed, thus making it possible to more accurately detect the state of the liquid.

In the liquid sensor, a configuration is possible in which the optical waveguide further includes a connection portion that connects the first pillar portion and the second pillar portion.

In this liquid sensor, the first pillar portion and the second pillar portion are connected by the connection portion. Accordingly, the relative positional relationship between the first pillar portion and the second pillar portion 11 does not change. As a result, according to the liquid sensor, the leakage of light to the outside of the optical waveguide is relatively suppressed, thus making it possible to more accurately detect the state of the liquid.

In the liquid sensor, a configuration is possible in which the second end surface is tilted at an angle of approximately 45 degrees relative to the first end surface, and the fourth end surface is tilted at an angle of approximately 45 degrees relative to the third end surface.

In the liquid sensor, a configuration is possible in which a reflecting portion made of a material having a higher reflectivity than a material that forms the optical waveguide is formed on at least one of the second end surface and the fourth end surface.

In this liquid sensor, a reflecting portion is formed on at least either the second end surface or the fourth end surface. Accordingly, in this liquid sensor, the leakage of light from at least either the second end surface or the fourth end surface is suppressed. As a result, according to the liquid sensor, the leakage of light to the outside of the optical waveguide is relatively suppressed, thus making it possible to more accurately detect the state of the liquid.

In the liquid sensor, a configuration is possible in which a notch for the liquid is formed in at least one of the first pillar portion and the second pillar portion.

In this liquid sensor, light passes through the liquid in the notch. Therefore, according to this liquid sensor, light can pass through a larger amount of liquid, and the state of the liquid can be more accurately reflected by the amount of light received by the light receiving element, thus making it possible to more accurately detect the state of the liquid.

According to the present invention, it is possible to provide a liquid sensor that can more accurately detect the state of a liquid.

EMBODIMENTS OF THE INVENTION

Figure 1:
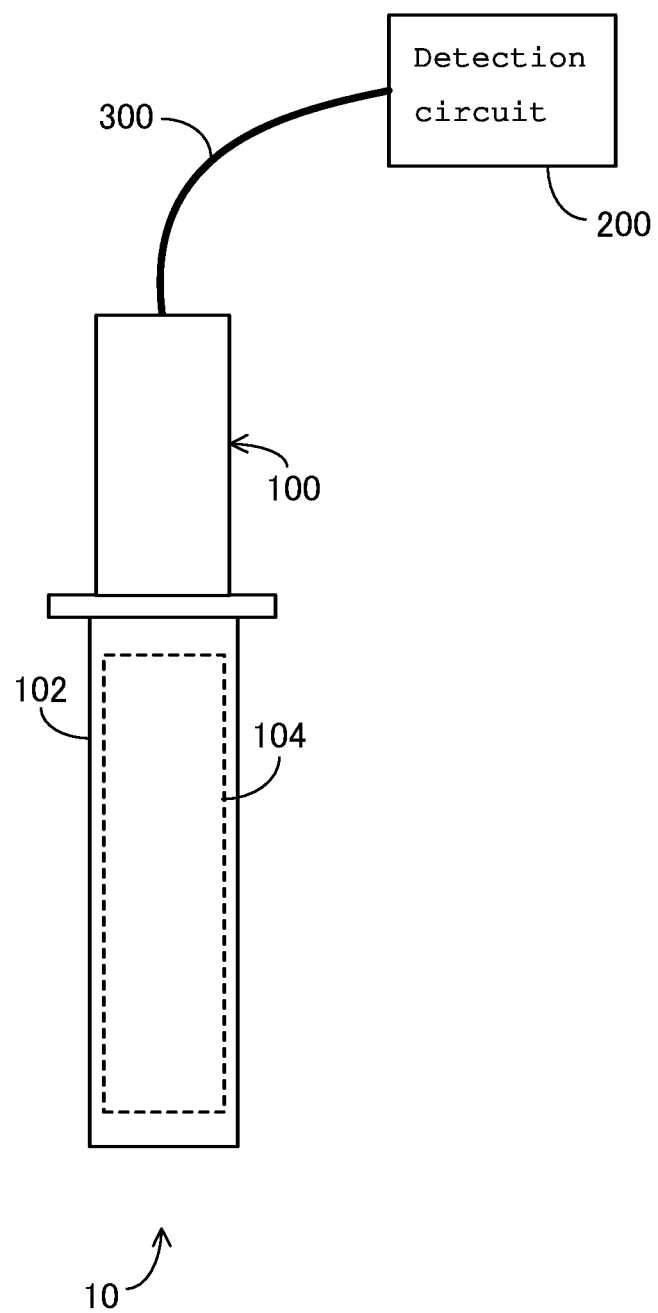
FIG. 1 is a diagram schematically showing a configuration of a liquid sensor.

Hereinafter, an embodiment of the present invention will be described in detail with reference to the drawings. Note that the same or corresponding parts in the drawings are denoted by the same reference numerals, and redundant descriptions will not be given for such parts.

1. First Embodiment

1-1. Overall Configuration of Liquid Sensor

FIG. 1 is a diagram schematically showing the configuration of a liquid sensor 10 according to a first embodiment. The liquid sensor 10 is mounted in the oil tank of a vehicle or the like, and is configured to optically detect the liquid quality of fuel (oil). Specifically, the liquid sensor 10 is configured to detect the liquid quality of fuel while being at least partially immersed in the fuel.

As shown in FIG. 1, the liquid sensor 10 includes a liquid sensor body 100, a detection circuit 200, and a cable 300. The liquid quality detection unit 104 is housed in a tubular plug 102 of the liquid sensor body 100. Although described in detail later, in the liquid quality detection unit 104, light is emitted toward the fuel, and light that has passed through the fuel is received. In the liquid sensor 10, the liquid quality of the fuel is detected based on the amount of light that has passed through the fuel. Hereinafter, the liquid quality detection unit 104 will be described in detail.

1-2. Configuration of Liquid Quality Detection Unit

Figure 2:
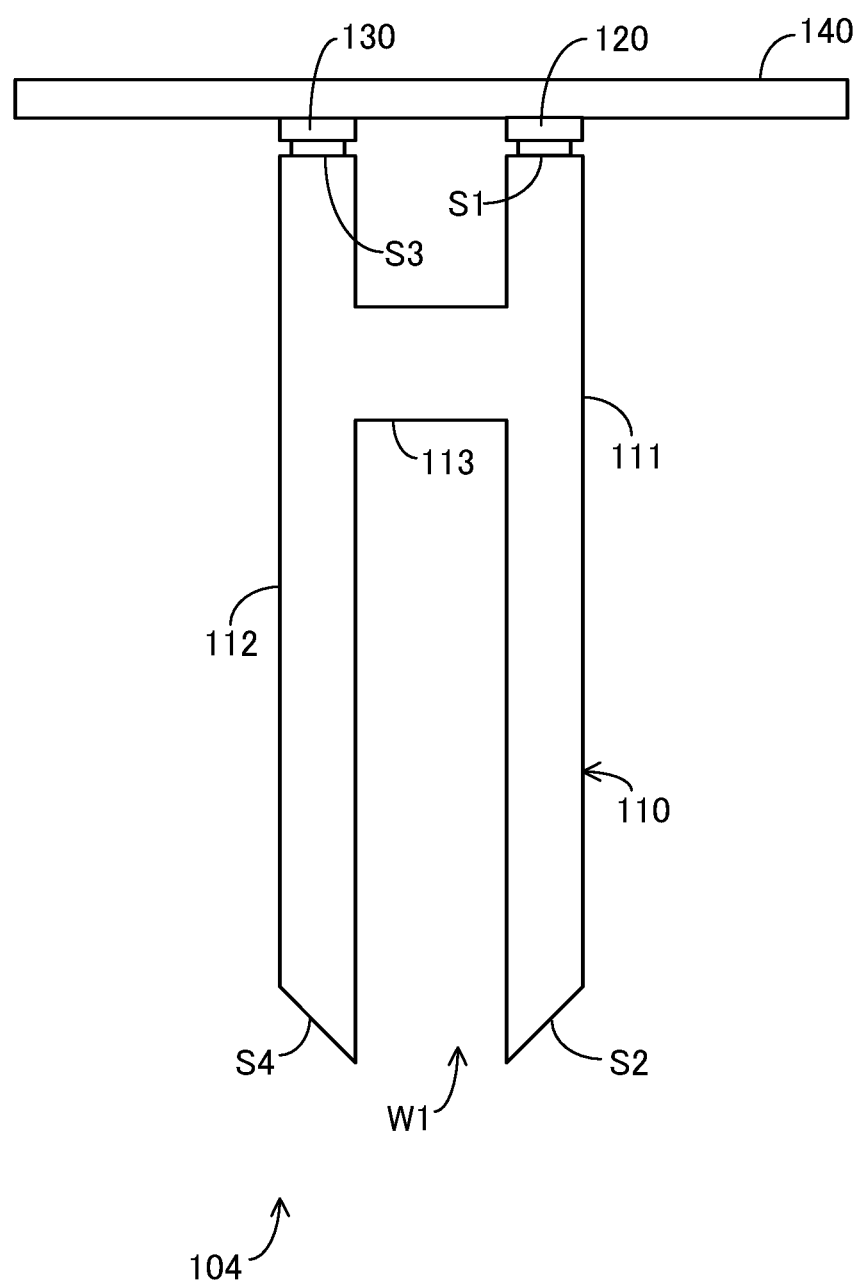
FIG. 2 is a diagram schematically showing a configuration of a liquid quality detection unit.

FIG. 2 is a diagram schematically showing the configuration of the liquid quality detection unit 104. As shown in FIG. 2, the liquid quality detection unit 104 includes an optical waveguide 110, a light emitting element 120, a light receiving element 130, and a conversion board 140.

The optical waveguide 110 is made of a material that allows light to pass through. For example, the optical waveguide 110 is made of a transparent resin such as polycarbonate. The optical waveguide 110 includes a first pillar portion 111, a second pillar portion 112, and a connection portion 113.

The first pillar portion 111 and the second pillar portion 112 are both shaped as a straight rectangular column. A side surface of the first pillar portion 111 that extends in the lengthwise direction faces a side surface of the second pillar portion 112 that extends in the lengthwise direction. A space W1 is formed between the first pillar portion 111 and the second pillar portion 112. The connection portion 113 is a plate-shaped portion that extends between the first pillar portion 111 and the second pillar portion 112. The first pillar portion 111 and the second pillar portion 112 are connected by the connection portion 113. Because the first pillar portion 111 and the second pillar portion 112 are connected by the connection portion 113, the relative positional relationship between the first pillar portion 111 and the second pillar portion 112 is not likely to shift.

A first end surface S1 is formed at one lengthwise end portion of the first pillar portion 111. The first end surface S1 faces the light emitting element 120. A second end surface S2 is formed at the other lengthwise end portion of the first pillar portion 111.

Also, a third end surface S3 is formed at one lengthwise end portion of the second pillar portion 112. The third end surface S3 faces the light receiving element 130. A fourth end surface S4 is formed at the other lengthwise end portion of the second pillar portion 112.

Figure 3:
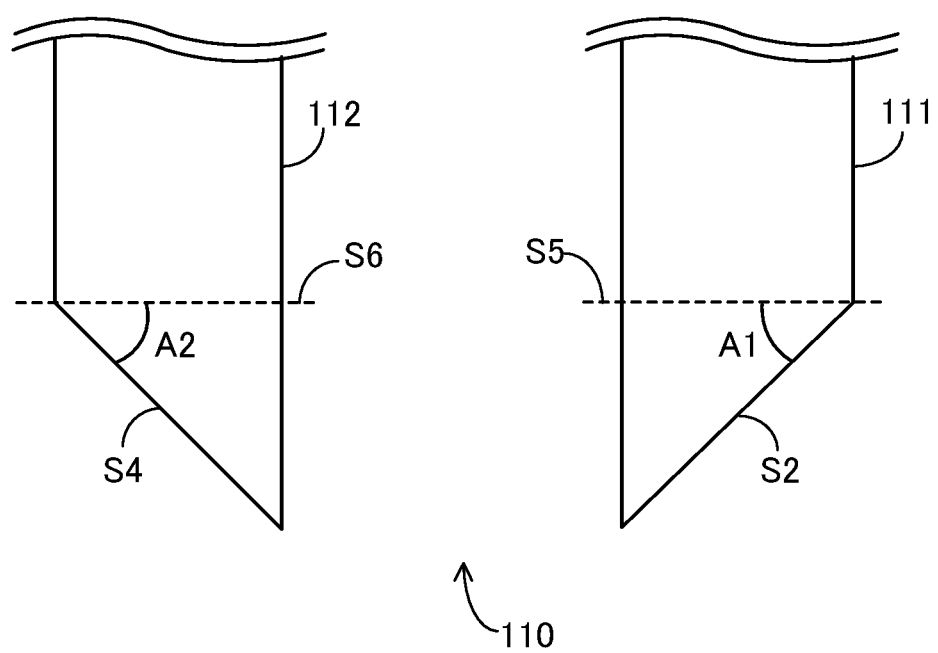
FIG. 3 is a diagram schematically showing leading end portions of an optical waveguide.

FIG. 3 is a diagram schematically showing leading end portions of the optical waveguide 110. As shown in FIG. 3, a surface S5 is a virtual surface that is parallel to the first end surface S1 (FIG. 2) of the first pillar portion 111, and a surface S6 is a virtual surface that is parallel to the third end surface S3 of the second pillar portion 112 (FIG. 2).

The second end surface S2 is tilted at an angle A1 relative to the surface S5. In other words, the second end surface S2 is tilted at the angle A1 relative to the first end surface S1. Also, the fourth end surface S4 is tilted at an angle A2 relative to the surface S6. In other words, the fourth end surface S4 is tilted at the angle A2 relative to the third end surface S3. The angles A1 and A2 are each approximately 45°.

Returning to FIG. 2, the light emitting element 120 is constituted by an LED (Light Emitting Diode) or a semiconductor laser, for example. The light emitting element 120 is configured to emit light in accordance with an instruction from the detection circuit 200 (FIG. 1). The light emitting element 120 is mounted on the conversion board 140. For example, the detection circuit 200 applies a constant voltage to the light emitting element 120 to cause the light emitting element 120 to emit light with a constant light quantity. The detection circuit 200 causes the light emitting element 120 to emit light at a required timing.

The light receiving element 130 is constituted by a photoresistor, a photodiode, or a photoconductive cell, for example. The light receiving element 130 is configured to receive light that was emitted by the light emitting element 120 and has passed through the optical waveguide 110 and the space W1. The light receiving element 130 is mounted on the conversion board 140.

The conversion board 140 is configured to convert the output of the light receiving element 130 into a voltage. In the conversion board 140, a voltage that corresponds to the amount of light received by the light receiving element 130 is output. The output line of the conversion board 140 and the input line for input to the light emitting element 120 are electrically connected to the detection circuit 200 via the cable 300.

Figure 4:
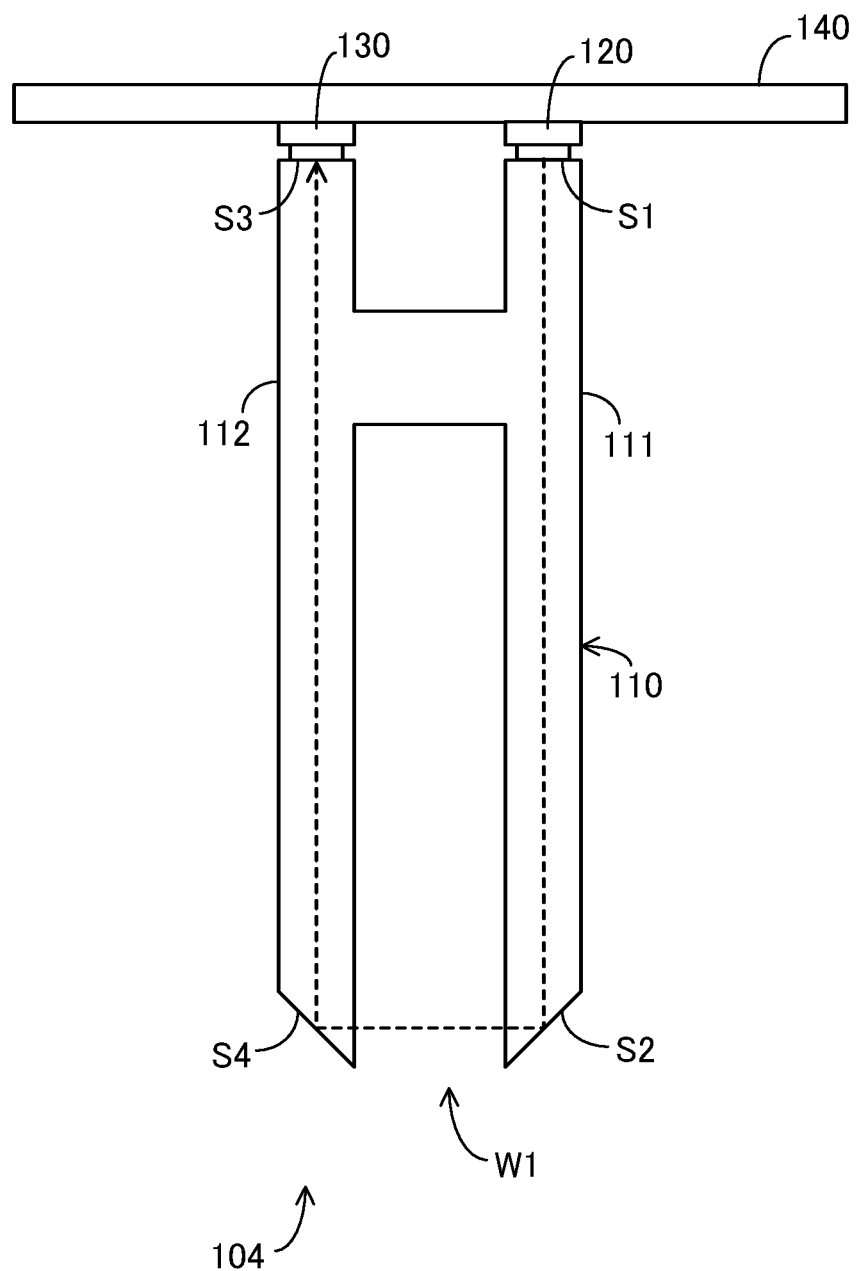
FIG. 4 is a diagram for describing an example of a path of light passing through the optical waveguide.

FIG. 4 is a diagram for describing an example of the path of light passing through the optical waveguide 110. As shown in FIG. 4, when the liquid sensor 10 is to be used, the liquid quality detection unit 104 is first immersed in fuel. When the liquid quality detection unit 104 is immersed in the fuel, fuel is present in the space W1.

Light emitted by the light emitting element 120 enters the first end surface S1 perpendicularly, for example. The light that has entered the first end surface S1 travels through the first pillar portion 111 and is reflected toward the second pillar portion 112 by the second end surface S2. The light reflected by the second end surface S2 passes through the fuel in the space W1 and enters the second pillar portion 112. The light that has entered the second pillar portion 112 is reflected by the fourth end surface S4. The light reflected by the fourth end surface S4 travels through the second pillar portion 112, enters the third end surface S3, and is received by the light receiving element 130.

If the liquid quality of the fuel in the space W1 is good (high transparency), the intensity of the light received by the light receiving element 130 is strong. On the other hand, if the liquid quality of the fuel existing in the space W1 is poor (low transparency), the intensity of the light received by the light receiving element 130 is weak. The detection circuit 200 stores a relationship between the amount of light received by the light receiving element 130 and the liquid quality of the fuel in advance, and detects the liquid quality of the fuel based on the amount of light received by the light receiving element 130.

In the liquid sensor 10 of the first embodiment, the first pillar portion 111 and the second pillar portion 112 each extend straight and do not have a bent structure. Accordingly, the leakage of light traveling through the first pillar portion 111 and the second pillar portion 112 is suppressed compared with the case where the pillar portions have a bent structure, for example. Therefore, according to the liquid sensor 10, the leakage of light to the outside of the optical waveguide 110 is relatively suppressed, and thus the state of the liquid (e.g., liquid quality) can be detected with higher accuracy.

1-3. Detection Operation

Figure 5:
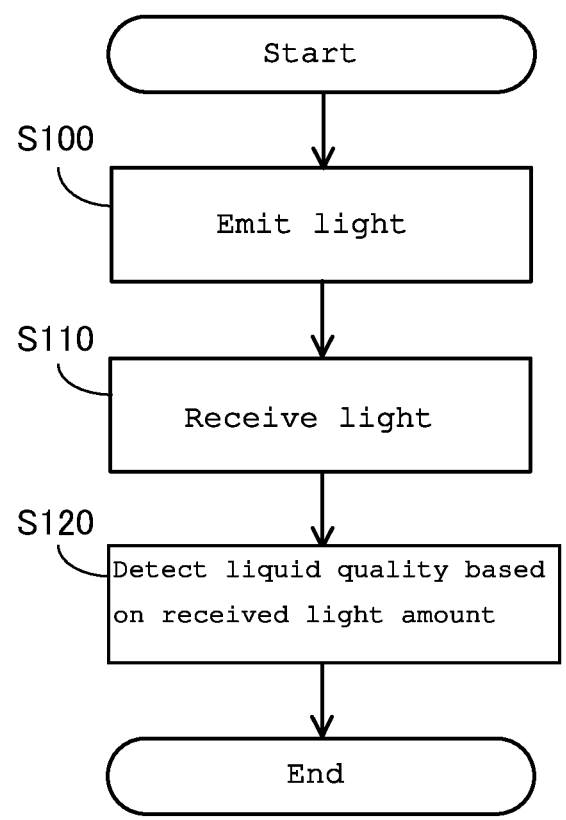
FIG. 5 is a flowchart showing a liquid quality detection procedure of the liquid sensor.

FIG. 5 is a flowchart showing a liquid quality detection procedure of the liquid sensor 10. As shown in FIG. 5, the detection circuit 200 causes the light emitting element 120 to emit light (step S100). The light receiving element 130 receives the light that has passed through the optical waveguide 110 and the space W1, and the conversion board 140 outputs a voltage that corresponds to the amount of received light to the detection circuit 200 (step S110). The detection circuit 200 detects the liquid quality of the fuel based on the voltage that corresponds to the amount of received light (step S120).

1-4. Features

As described above, in the liquid sensor 10 according to the first embodiment, the optical waveguide 110 is constituted by the first pillar portion 111 and the second pillar portion 112. Because the first pillar portion 111 and the second pillar portion 112 are each straight and do not have a bent structure, the leakage of light passing through the first pillar portion 111 and the second pillar portion 112 is suppressed more than in the case where the light transmitting portions have a bent structure. Therefore, according to the liquid sensor 10, the leakage of light to the outside of the optical waveguide 110 is relatively suppressed, thus making it possible to more accurately detect the state of the liquid.

Also, in the liquid sensor 10, the first pillar portion 111 and the second pillar portion 112 are connected by the connection portion 113. Accordingly, the relative positional relationship between the first pillar portion 111 and the second pillar portion 112 does not change. As a result, according to the liquid sensor 10, the leakage of light to the outside of the optical waveguide 110 is relatively suppressed, thus making it possible to more accurately detect the state of the liquid.

2. Second Embodiment

In a liquid sensor according to a second embodiment, the configuration of the optical waveguide is different from that of the liquid sensor 10 according to the first embodiment. The following describes differences from the first embodiment. Repeated descriptions will not be given for portions that are the same.

2-1. Configuration of Optical Waveguide

Figure 6:
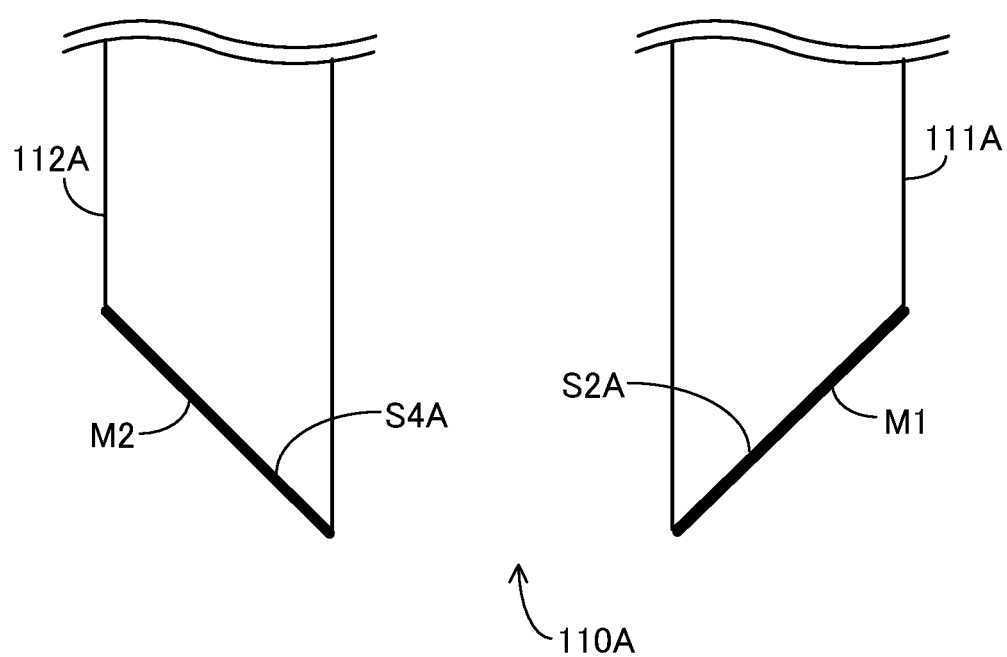
FIG. 6 is a diagram schematically showing leading end portions of an optical waveguide in a second embodiment.

FIG. 6 is a diagram schematically showing leading end portions of an optical waveguide 110A in the liquid sensor according to the second embodiment. As shown in FIG. 6, a reflecting portion M1 is formed on a second end surface S2A formed in one lengthwise end portion of the first pillar portion 111A, and a reflecting portion M2 is formed on a fourth end surface S4A formed in one lengthwise end portion of the second pillar portion 112A.

The reflecting portions M1 and M2 are each made of a material that has a higher reflectivity than the material that forms the optical waveguide 110A (e.g., a transparent resin such as polycarbonate). The reflecting portions M1 and M2 are each made of a metal such as aluminum, copper, or stainless steel. The reflecting portions M1 and M2 are formed by adhering a metal plate to the second end surface S2A and the fourth end surface S4A, for example. As another example, the reflecting portions M1 and M2 may be formed on the second end surface S2A and the fourth end surface S4A by metal vapor deposition, plating, or application.

2-2. Features

As described above, in the liquid sensor according to the second embodiment, the reflecting portions M1 and M2 are respectively formed on the second end surface S2A and the fourth end surface S4A. Therefore, in the liquid sensor according to the second embodiment, when light emitted by the light emitting element 120 enters the second end surface S2A and the fourth end surface S4A, almost none of the light at the second end surface S2A and the fourth end surface S4A leaks out from the optical waveguide 110A. As a result, according to the liquid sensor of the second embodiment, the leakage of light to the outside of the optical waveguide 110A is relatively suppressed, thus making it possible to more accurately detect the state of the liquid.

3. Variations

Although the first and second embodiments have been described above, the present invention is not limited to the first and second embodiments, and various variations can be made without departing from the spirit of the embodiment. Variations will be described below.

<3-1>

In the first and second embodiments, the first pillar portions 111 and 111A and the second pillar portions 112 and 112A are each shaped as a straight rectangular column. However, the shapes of the first pillar portions 111 and 111A and the second pillar portions 112 and 112A are not limited to this. For example, the first pillar portions 111 and 111A and the second pillar portions 112 and 112A may each be provided with a notch cut out in a direction perpendicular to the traveling direction of light.

Figure 7:
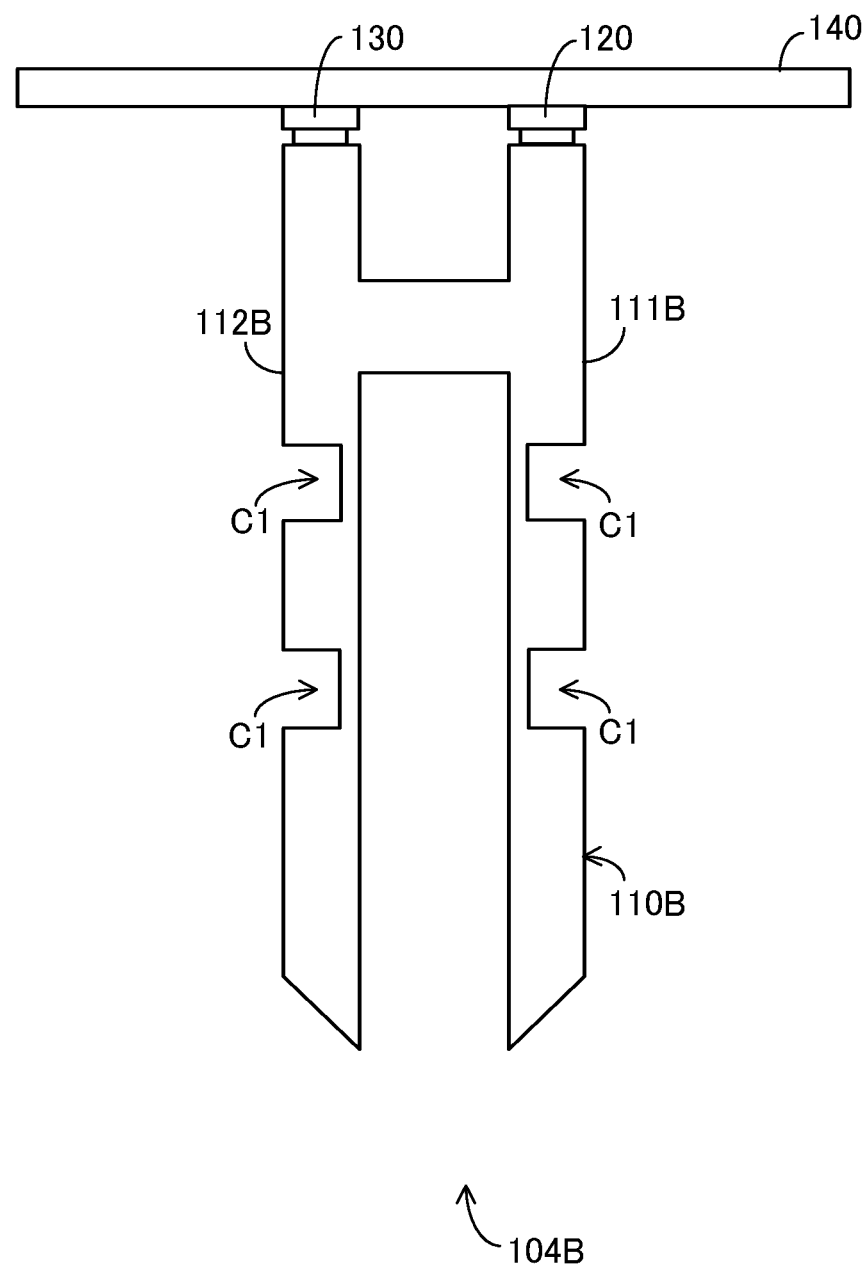
FIG. 7 is a diagram schematically showing an example of the configuration of the liquid quality detection unit in a variation.

FIG. 7 is a diagram schematically showing an example of the configuration of a liquid quality detection unit 104B in a variation. As shown in FIG. 7, in the liquid quality detection unit 104B, a first pillar portion 111B and a second pillar portion 112B are each provided with a plurality of notches C1 formed in a direction perpendicular to the traveling direction of light. In other words, the first pillar portion 111B and the second pillar portion 112B are each provided with a plurality of recessed portions that are recessed in a direction perpendicular to the traveling direction of light.

When the liquid sensor of this variation is to be used, the liquid quality detection unit 104B is first immersed in fuel. In this case, fuel is present in the space W1 and the notches C1. In this liquid sensor, the light emitted by the light emitting element 120 passes through the liquid located in the space W1 and the notches C1. Therefore, according to this liquid sensor, light can pass through a larger amount of liquid, and the state of the liquid can be more accurately reflected by the amount of light received by the light receiving element 130, thus making it possible to more accurately detect the state of the liquid.

<3-2>

In the first and second embodiments, the first pillar portions 111 and 111A and the second pillar portions 112 and 112A are connected by the connection portion 113. However, the first pillar portions 111 and 111A and the second pillar portions 112 and 112A do not necessarily need to be connected by the connection portion 113. The first pillar portions 111 and 111A and the second pillar portions 112 and 112A may be independent members.

<3-3>

In the first and second embodiments, the second end surfaces S2 and S2A are tilted at the angle A1 relative to the first end surface S1, and the fourth end surfaces S4 and S4A are tilted at the angle A2 relative to the third end surface S3. Also, the angles A1 and A2 are each approximately 45°. However, the angles A1 and A2 do not necessarily need to be approximately 45°. The angles A1 and A2 may be any angle as long as a relationship is established in which the second end surfaces S2 and S2A reflect light toward the second pillar portions 112 and 112A, and the fourth end surfaces S4 and S4A reflect light from the second end surfaces S2 and S2A toward the light receiving element 130.

<3-4>

In the first and second embodiments, a plate-shaped liquid level sensor may be arranged between the first pillar portions 111 and 111A and the second pillar portions 112 and 112A, for example. For example, the liquid level sensor is provided with a hole, and two electrodes are formed at opposite positions in the hole. The remaining amount of fuel is detected based on a change in capacitance detected by applying a voltage between the two electrodes, for example.

<3-5>

In the first and second embodiments, the liquid sensor 10 or the like is mounted in an oil tank, and the liquid quality of fuel is detected. However, the liquid quality detected by the liquid sensor 10 or the like is not limited to the liquid quality of fuel. The liquid sensor 10 or the like may be mounted in a tank that vibrates during operation, and may detect the liquid quality of water, various aqueous solutions (e.g., an acidic aqueous solution or an alkaline aqueous solution), alcohols, solvents, or oils (e.g., working oil or lubricating oil in a device that vibrates). In other words, it is sufficient that the liquid sensor 10 or the like detects the liquid quality of a liquid while being at least partially immersed in the liquid.

<3-6>

In the first and second embodiments, the first pillar portions 111 and 111A and the second pillar portions 112 and 112A are each shaped as a straight rectangular column. However, the shapes of the first pillar portions 111 and 111A and the second pillar portions 112 and 112A do not necessarily need to be such shapes. The first pillar portions 111 and 111A and the second pillar portions 112 and 112A may each be shaped as a straight circular column, for example.

<3-7>

In the second embodiment, a reflecting portion (M1, M2) is provided on both the second end surface S2A and the fourth end surface S4A. However, it is not necessary required that the reflecting portion is provided on both the second end surface S2A and the fourth end surface S4A. For example, a reflecting portion may be provided on only either the second end surface S2A or the fourth end surface S4A.

LIST OF REFERENCE NUMERALS

10 Liquid sensor
100 Liquid sensor body
102 Plug
104, 104B Liquid quality detection unit
110, 110A, 110B Optical waveguide
111, 111A, 111B First pillar portion
112, 112A, 112B Second pillar portion
113 Connection portion
120 Light emitting element
130 Light receiving element
140 Conversion board
200 Detection circuit
300 Cable
A1, A2 Angle
C1 Notch
M1, M2 Reflecting portion
S1 First end surface
S2, S2A Second end surface
S3 Third end surface
S4, S4A Fourth end surface
S5, S6 Surface
W1 Space

What is claimed is:

1. A liquid sensor configured to detect a state of a liquid, comprising:
   a light emitting element;
   an optical waveguide;
   a light receiving element configured to receive light that was emitted by the light emitting element and passed through the optical waveguide; and
   a detection circuit configured to detect output of the light receiving element,
   wherein the optical waveguide includes:
      a first pillar portion that extends straight, and
      a second pillar portion that extends straight and is provided at a position opposing the first pillar portion,
   a space for the liquid is formed between the first pillar portion and the second pillar portion,
   the first pillar portion includes a first end surface that faces the light emitting element, and a second end surface that is tilted relative to the first end surface and is configured to reflect the light toward the second pillar portion, and
   the second pillar portion includes a third end surface that faces the light receiving element, and a fourth end surface that is tilted relative to the third end surface and is configured to reflect the light from the second end surface toward the light receiving element,
   wherein the optical waveguide further includes a connection portion that connects the first pillar portion and the second pillar portion,
   the first pillar portion, the second pillar portion, and the connection portion are integrally composed of a same material.

2. The liquid sensor according to claim 1,
   wherein the second end surface is tilted at an angle of approximately 45 degrees relative to the first end surface, and
   the fourth end surface is tilted at an angle of approximately 45 degrees relative to the third end surface.

3. The liquid sensor according to claim 1,
   wherein a reflecting portion made of a material having a higher reflectivity than a material that forms the optical waveguide is formed on at least one of the second end surface and the fourth end surface.

4. The liquid sensor according to claim 1, wherein a notch for the liquid is formed in at least one of the first pillar portion and the second pillar portion.

5. The liquid sensor according to claim 1, wherein the optical waveguide is composed of a transparent resin.

* * * * *